(12) United States Patent
Kramerich et al.

(10) Patent No.: US 7,415,510 B1
(45) Date of Patent: Aug. 19, 2008

(54) SYSTEM FOR INDEXING PEDESTRIAN TRAFFIC

(75) Inventors: George Kramerich, Morton Grove, IL (US); Barbara Johnson, Elk Grove Village, IL (US); Krista Diberardino, Lake Villa, IL (US); William Jackewicz, McHenry, IL (US); James Martin, Grays Lake, IL (US); Andrew Voss, Buffalo Grove, IL (US)

(73) Assignee: Shoppertrack RCT Corporation, Chicago, IL (US)

( * ) Notice: Subject to any disclaimer, the term of this patent is extended or adjusted under 35 U.S.C. 154(b) by 0 days.

(21) Appl. No.: 09/936,987

(22) PCT Filed: Mar. 17, 2000

(86) PCT No.: PCT/US00/07001

§ 371 (c)(1),
(2), (4) Date: Mar. 5, 2002

(87) PCT Pub. No.: WO00/57287

PCT Pub. Date: Sep. 28, 2000

Related U.S. Application Data

(60) Provisional application No. 60/125,451, filed on Mar. 19, 1999.

(51) Int. Cl.
*G06F 15/16* (2006.01)
*G06F 15/173* (2006.01)
*G06F 17/30* (2006.01)
*G07B 15/00* (2006.01)
*G07B 15/02* (2006.01)
*G07G 1/00* (2006.01)

(52) U.S. Cl. .................. 709/219; 709/217; 709/223; 709/224; 705/10; 705/13

(58) Field of Classification Search ......... 709/217–219, 709/223–224, 209; 705/10, 14, 13; 348/149; 701/118
See application file for complete search history.

(56) References Cited

U.S. PATENT DOCUMENTS 5,369,571 A    11/1994   Metts (Continued)

FOREIGN PATENT DOCUMENTS

EP    0 967 584 A2    12/1999

(Continued)

*Primary Examiner*—William C. Vaughn, Jr.
*Assistant Examiner*—Peling A Shaw
(74) *Attorney, Agent, or Firm*—Oppenheimer Wolff & Donnelly LLP

(57) ABSTRACT

A system and a method for indexing pedestrian traffic are disclosed. Traffic information is gathered from counter units (30, 31) placed at entrances in provider malls, retail stores, or other locations where pedestrians may be counted. The counters give daily reports to the traffic indexing system (40) of the amount of pedestrian traffic flowing through traffic monitoring points (30, 31). Traffic data are collected daily from providers and compiled into an index (40). These data may be integrated and indexed with other data such as sales data, labor data and promotion data. Providers (30, 31) and other users (45) may access the traffic index (40) along with other industry information to gauge their performance as compared to the performance of others in the industry or to make educated decisions on development and marketing issues.

29 Claims, 13 Drawing Sheets

U.S. PATENT DOCUMENTS

| | | | | |
|---|---|---|---|---|
| 5,465,115 | A * | 11/1995 | Conrad et al. | 348/155 |
| 5,485,347 | A | 1/1996 | Miura | |
| 5,541,835 | A * | 7/1996 | Dextraze et al. | 705/10 |
| 5,559,496 | A | 9/1996 | Dubats | 340/539 |
| 5,633,946 | A * | 5/1997 | Lachinski et al. | 382/103 |
| 5,696,965 | A * | 12/1997 | Dedrick | 707/10 |
| 5,712,830 | A * | 1/1998 | Ross et al. | 367/93 |
| 5,712,985 | A * | 1/1998 | Lee et al. | 705/7 |
| 5,717,923 | A * | 2/1998 | Dedrick | 707/102 |
| 5,764,283 | A | 6/1998 | Pingali et al. | 348/169 |
| 5,812,951 | A | 9/1998 | Ganesan et al. | 455/445 |
| 5,832,456 | A * | 11/1998 | Fox et al. | 705/10 |
| 5,918,225 | A | 6/1999 | White et al. | 707/3 |
| 5,920,057 | A * | 7/1999 | Sonderegger et al. | 235/384 |
| 5,923,252 | A * | 7/1999 | Sizer et al. | 340/573.1 |
| 5,969,755 | A * | 10/1999 | Courtney | 348/143 |
| 5,973,732 | A * | 10/1999 | Guthrie | 348/169 |
| 5,974,398 | A * | 10/1999 | Hanson et al. | 705/14 |
| 6,018,697 | A | 1/2000 | Morimoto et al. | 701/209 |
| 6,073,174 | A * | 6/2000 | Montgomerie et al. | 709/224 |
| 6,119,101 | A * | 9/2000 | Peckover | 705/26 |
| 6,133,912 | A * | 10/2000 | Montero | 715/716 |
| 6,151,584 | A * | 11/2000 | Papierniak et al. | 705/10 |
| 6,166,729 | A * | 12/2000 | Acosta et al. | 715/719 |
| 6,208,975 | B1 * | 3/2001 | Bull et al. | 705/14 |
| 6,216,119 | B1 * | 4/2001 | Jannarone | 706/26 |
| 6,327,619 | B1 * | 12/2001 | Blumenau | 709/224 |
| 6,343,274 | B1 * | 1/2002 | McCollom et al. | 705/26 |
| 6,584,447 | B1 * | 6/2003 | Fox et al. | 705/10 |
| 6,618,709 | B1 * | 9/2003 | Sneeringer | 705/412 |
| 6,671,675 | B2 * | 12/2003 | Iwamura | 705/30 |
| 6,697,104 | B1 * | 2/2004 | Yakobi et al. | 348/143 |
| 6,924,748 | B2 * | 8/2005 | Obradovich et al. | 340/905 |

FOREIGN PATENT DOCUMENTS

WO      WO 94/27408      11/1994

* cited by examiner

SYSTEM FOR INDEXING PEDESTRIAN TRAFFIC

This application is a 371 of PCT/US00/07001 filed on Mar. 17, 2000 which claims the benefit of 60/125,451 filed on Mar. 19, 1999. The filing date is Mar. 5, 2002.

FIELD OF THE INVENTION

This invention relates generally to the field of data indexing and, more particularly, relates to an apparatus and method for indexing data related to pedestrian traffic within industry segments.

BACKGROUND OF THE INVENTION

The retail industry is a large and consistently important segment of the economy and, as a result, it is a highly competitive industry. Even in the face of increasingly popular electronic commerce options, retail spaces such as shopping malls remain a vital and growing segment of the retail industry. Mall developers, retailers, advertisers, industry analysts, and real estate consultants consistently make difficult business decisions on where to develop, what products to promote, what types of promotions to invest in, and other issues related to retail industry statistics, but many of these decisions have to be made with fairly limited information. If given access to a reliable source of information on retail industry traffic and pedestrian traffic in general, key decision makers in the industry could make much more efficient and effective decisions based on accurate information rather than conjecture. Information on pedestrian traffic is also valuable in a variety of non-retail planning scenarios.

The present invention is directed to fulfilling the need for accurate and consistently updated information on pedestrian traffic.

SUMMARY OF THE INVENTION

The present invention comprises a method and system for indexing pedestrian traffic and other data. The method involves collecting pedestrian count, sales, labor data, and other information from information providers. Projections and compilations for use by industry participants and other interested users are generated from the data. Indexes are created on traffic data and on measures generated through integration of traffic data with other data such as sales data and labor data.

The data collected from providers are edited for usability and a variety of database administration functions may be performed on the data before projections and compilations are made available to users.

The method and system generate a pedestrian traffic index, which is capable of measuring and comparing pedestrian traffic trends across a variety of location characteristics, such as, for example, region, size, age, and sales. A variety of other indexes may be produced by the present invention, with some indexes including more data than others. If used in a shopping mall scenario, the pedestrian traffic index contains information on traffic trends and indicators such as national traffic, total traffic by region, national traffic by location size and national mall visits per square foot. The pedestrian traffic index for shopping malls may also may contain information on tenant characteristics, such as tenant presence and anchor presence in shopping malls. Further, the pedestrian traffic index can give key economic predictors, such as peak traffic times, national peak day by week, and comparisons to tenant sales.

This information has a variety of benefits for users. For example, it will enable users to quantify and prove the value of commercial real estate portfolios using consistent, accepted national standards. Further, users will be able to quantify the value of their portfolios to corporate sponsors using objective performance measures. In addition, retailers will be able to correlate sales data with shopper traffic, identify areas of opportunity to increase shopper conversion, and evaluate site selection alternatives based on shopper penetration. Industry analysts will be able to simplify property and portfolio analysis using a standardized set of performance metrics and assess property results on a national basis relative to same sizes and types of malls. Further, advertisers and corporate sponsors will be able to identify promotion-responsive regions and malls and establish campaign objectives using reliable, nationally-comparable measures.

The present invention is implemented using a scalable system of data collection, processing, and delivery methods. Data collection at information provider locations uses counting technology wherein data collection sensors such as cameras, motion sensors, light sensors, and/or other sensors are connected to one or more hubs. The hubs are connected to the Internet and data are sent from information providers to the indexing hardware and software. The data may be sent over a virtual private network ("VPN"), over the Internet alone, via a standalone computer network, or via any other data transmission means. Data are also collected on a variety of topics for each information provider. Data on sales, labor, advertising, geographic data, and demographic data are collected in addition to pedestrian traffic data from information providers. A data management server provides processing and storage for a general data warehouse where the data is stored.

Incoming data are stored in the general data warehouse before they are processed by the data management server to develop products for users. Following this processing, the output products, including the pedestrian traffic index, are stored in data marts on a family of data mart servers. Access to these data marts is provided to users via one or more delivery web servers. The delivery web servers are accessible to users via the Internet through the use of a VPN. In addition, information in the data marts may also be made available to users via facsimile, mail, telephone, or any other communication method.

Information produced by the present invention is available to users in a variety of formats. In addition to the web server or servers, monthly publications also contain information on topics of interest to retailers, mall developers, financial analysts, and others in need of information on pedestrian traffic. Further, trend reports provide users with information on traffic fluctuation over determinable time periods.

BRIEF DESCRIPTION OF THE DRAWINGS

The foregoing and other advantages of the invention will become apparent upon reading the following detailed description and upon reference to the drawings in which.

Figure 1:
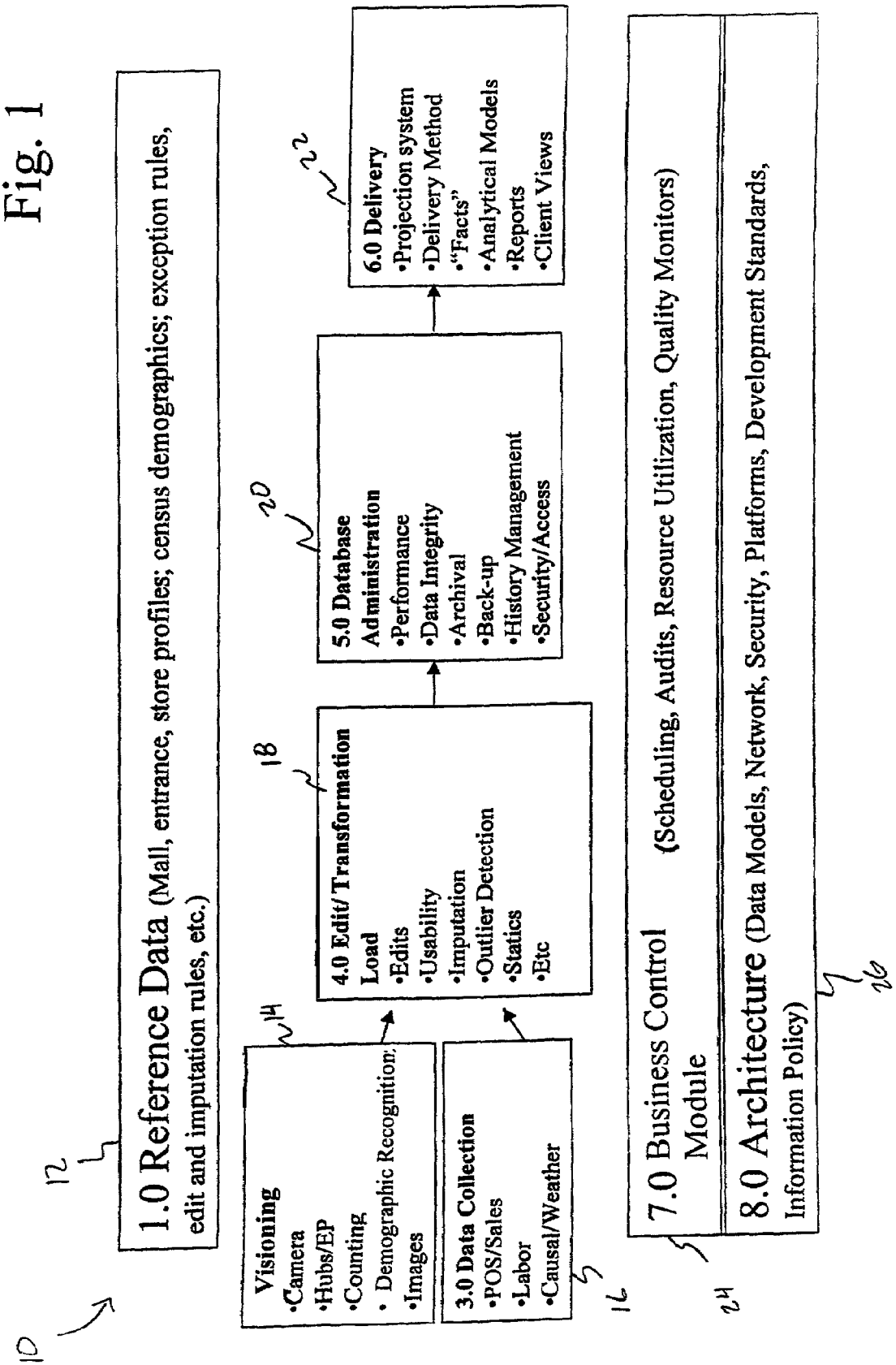
FIG. 1 is a block diagram giving an overview of the retail traffic indexing system of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

The present invention may be used in a variety of situations where a pedestrian traffic index may be developed and utilized. In one embodiment, the present invention is used to create an index of retail traffic in, for example, shopping malls and retail stores. In this embodiment, providers and users of information on pedestrian traffic are users to an indexing service. Turning now to the drawings and referring initially to FIG. 1, there is depicted an overview showing data utilization and data flow in a retail traffic indexing system 10 using the present invention. The system 10 is divided into several hardware and software modules which combine to collect data from users, store and manipulate the data into an index, and place the data in convenient and easily accessible formats. Users generally include shopping mall developers but may also include individual retailers or anyone else having an interest in pedestrian traffic information. In the mall or retail traffic embodiment, the present invention collects information from and about users and analyzes the collected information to produce the National Retail Traffic Index ("NRTI"), a comprehensive overview of nationwide retail traffic information. Such an index is significant because retail traffic is a prime indicator for the judicious development of retail outlets.

The reference data module 12 covers the collection and organization of data that supports market segmentation used in the system 10. Market segmentation is necessary for users to edit the large amount of information collected by the indexing system 10 into a usable format for users who may not be interested in several geographic or market areas. The reference data module 12 provides rules that drive the system 10 and data management activities in the system 10. Reference data encompassed by the reference data module 12 include mall, entrance, and store profiles, including attributes such as size, age, lighting, and remodeling histories of stores and entrances. Reference data also include projection factors and rules for applying projection factors to traffic data, information on geography and census demographics, exception rules for handling data, data outlier rules and rules for resolving outliers, and imputation rules for missing data.

These reference data are used in combination with visioning data gathered via the visioning module 14. The visioning module 14 includes technology for counting pedestrian traffic, recognizing demographics, and monitoring queues of people. The visioning module serves as the first step in pedestrian traffic data collection, and may incorporate a variety of sensors for counting pedestrian traffic, including but not limited to video cameras, still cameras, infrared cameras, pressure pads, light sensors, and motion detectors. In one embodiment, the visioning module 14 includes a camera sub-module which includes a camera-based pedestrian counting system and method as detailed in U.S. Pat. No. 5,465,115 to Conrad, which is assigned to the assignee of the present invention and is incorporated herein by reference in its entirety. The visioning module 14 may include multiple sensors at users' sites which are connected to one or more hubs. The data from the sensors are used in a counting algorithm and this forms the basis for the traffic data used in the present invention. Data from the visioning module 14 used in the system 10 may also include images from cameras located at users' sites.

A data collection module 16 serves a further data collection function. Data collected by the data collection module 16 include such data as advertising and promotion information for retailers and malls, retail sales data, labor expenses, and other financial data, information on retail sales transactions, and third party data such as census demographics, mall directories, and weather information. This business data may be collected from a variety of business data sources, including sources on the Internet and print sources.

The edit and transformation load module 18 contains applications that utilize reference data to identify data anomalies and to correct data based on rules provided by the reference data module 12. The edit and transformation load module 14 also contains applications that edit data for usability, perform an imputation function for missing data, and perform outlier detection for incoming numbers lying outside of an expected range. The data collection and analysis in one embodiment of the present invention is performed cyclically. For example, data may be collected and analyzed and indexes created on a partial day, daily, weekly, monthly, or other time basis. At times, unusable data may arise from the reference data module 12, the visioning module 14, or the data collection module 16. Usability factors are created by the edit and transformation load module 18 that adjust projection factors used by the system 10 during each processing cycle to deal with unusable data. Imputation rules from the reference data module 12 are also applied in the edit and transformation load module 18 to estimate missing data from the reference data module 12, the visioning module 14 and/or the data collection module 16.

Collected data are stored and manipulated in the database administration module 20. The database administration module 20 includes applications for assuring the performance of other modules and the integrity of data coming in from the edit and transformation load module 18. The database administration module 20 further fulfills archival functions to facilitate the use of collected data in analyzing long-term trends. The database administration module 20 also performs backup and history management functions and stores information on security and access to information compiled and created by the indexing system 10.

Index information and data collected by the indexing system 10 are available to users via the delivery module 22. The delivery module 22 represents the suite of applications and computations that project data relating to particular market segments of interest to users. The delivery module 22 comprises a variety of delivery methods, including delivery via website, printed publications, and user-specific reports.

The indexing system 10 is customizable using a business control module 24 capable of changing the performance of any of the other modules. The business control module 24 provides the technology and additional data to manage the indexing system 20. In one embodiment, the business control module uses push logic to optimize software performance and assess the operation of other modules in the indexing system 10. The business control module 24 further monitors and controls the scheduling of cycles in the indexing system 10, performs audits on the indexing system 10, handles resource utilization issues, and monitors the quality of all modules in the indexing system 10.

Figure 2:
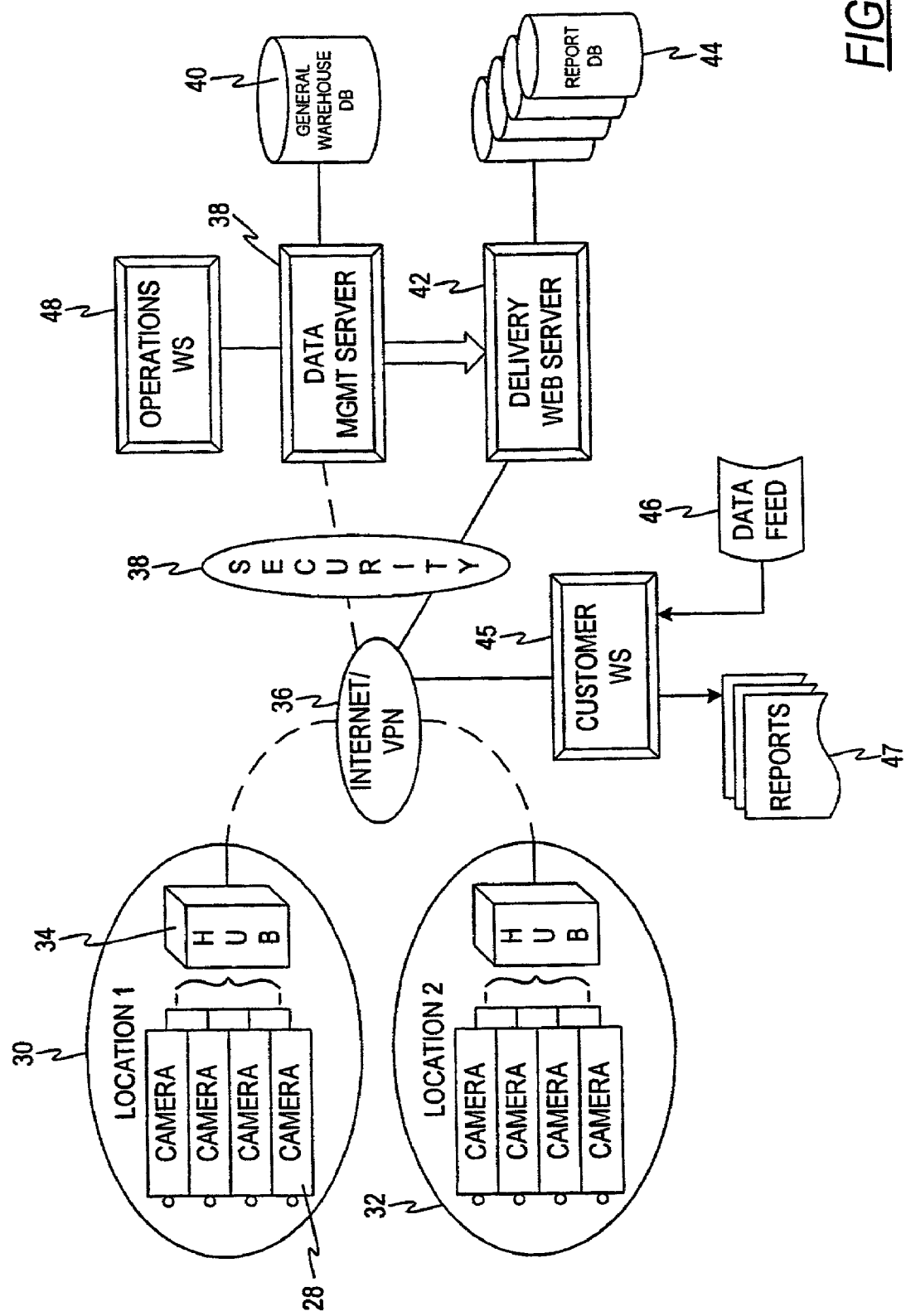
FIG. 2 is a block diagram showing technical architecture for use in the present invention.

The indexing system 10 is implemented using an architecture module 26. The architecture module 26 is a multi-tiered hardware architecture running on server based operating platforms and supported by a state of the art database management system ("DBMS") and software system. The architecture module is shown as a block diagram in FIG. 2.

The architecture module 26 includes the hardware needed to utilize and enable the indexing system 10 of the present invention. In one embodiment, the architecture module 26 includes cameras 28, adapted for identifying and counting retail traffic as disclosed in U.S. Pat. No. 5,465,115 to Conrad, located at users' sites. The indexing system 10 can be implemented using hundreds or thousands of user sites, but for convenience FIG. 2 displays only two locations, location one 30 and location two 32. If multiple cameras 28 are utilized at user locations, the output of the cameras is fed into a hub 34. The scalable quality of the present invention allows multiple hubs to be used at user locations if only one hub is incapable of handling all the data from the cameras 28. In one embodiment, the data collected by the cameras 28 and sent to the hub 34 at each user location are transferred over a VPN 36 on the Internet through a security feature 38 such as a firewall to a data management server 38. The VPN 36 also serves as the means through which users gain access to indexes and other informational products. Data transmission to and from users may also be accomplished using a variety of transmission models other than a VPN; for example, data may be transmitted over the Internet without a VPN, via direct modem connections, or via dedicated network connections.

The data management server 38 stores the incoming data from users and other sources in a general warehouse database 40 and also forwards the data to a delivery web server 42. The operation and supervision of the data management server 38 may be accomplished via an operations workstation 48. The delivery web server 42 compiles information from data sources and from the general warehouse database 40 and creates the NRTI along with other indexes. These indexes and related data are stored in data marts 44 located in a family of servers connected to the delivery web server 42.

When a user wants to review the NRTI or any other available data in the data marts 44, the user accesses a website and gains access to the delivery web server via the VPN/Internet 36. The delivery web server then locates the desired information in the data marts 44 and replies to a user request by routing the desired information over the VPN/Internet 36 and displaying it on the website. This may be accomplished through a customer workstation ("WS") 45. The customer workstation 45 may also be used to generate customer reports 47. The user or customer workstation 45 is also capable of accepting data from a user via a data feed 46.

The architecture module 26 is scalable in a variety of ways. For example, as users' locations grow or the numbers of entrances at users' locations increase, more cameras 28 and/or hubs 34 can be provided at the users' locations. Further, the hub and camera technology are capable of being switched to alternative detection means and signal transmission systems using technology such as digital signal processing ("DSP") to improve data transmission. Data transmission between the system 10 and users over the VPN 36 can be scaled by adding addresses for new user locations and by increasing bandwidth of the VPN. The data management server 38 can likewise be scaled upward by employing a larger server or several servers and/or by adding a larger scale server as a third tier to house the general warehouse database 40 and handle data updates and access to the data warehouse. A smaller server can then be left to handle the operational data management functionality. The present invention may be implemented on NT class operating systems, but additional scalability can be provided through the use of UNIX. In a preferred embodiment, the DBMS and development tools are all based in ORACLE, a multi-platform hardware/operating system package. In addition, the data marts 44 can be scaled to handle more data through the segregation of index products and other information products on separate servers. The architecture module 26 enables the data receipt and analysis functions that allow the production of NRTI indexes and other indexes in the present invention.

Figure 3:
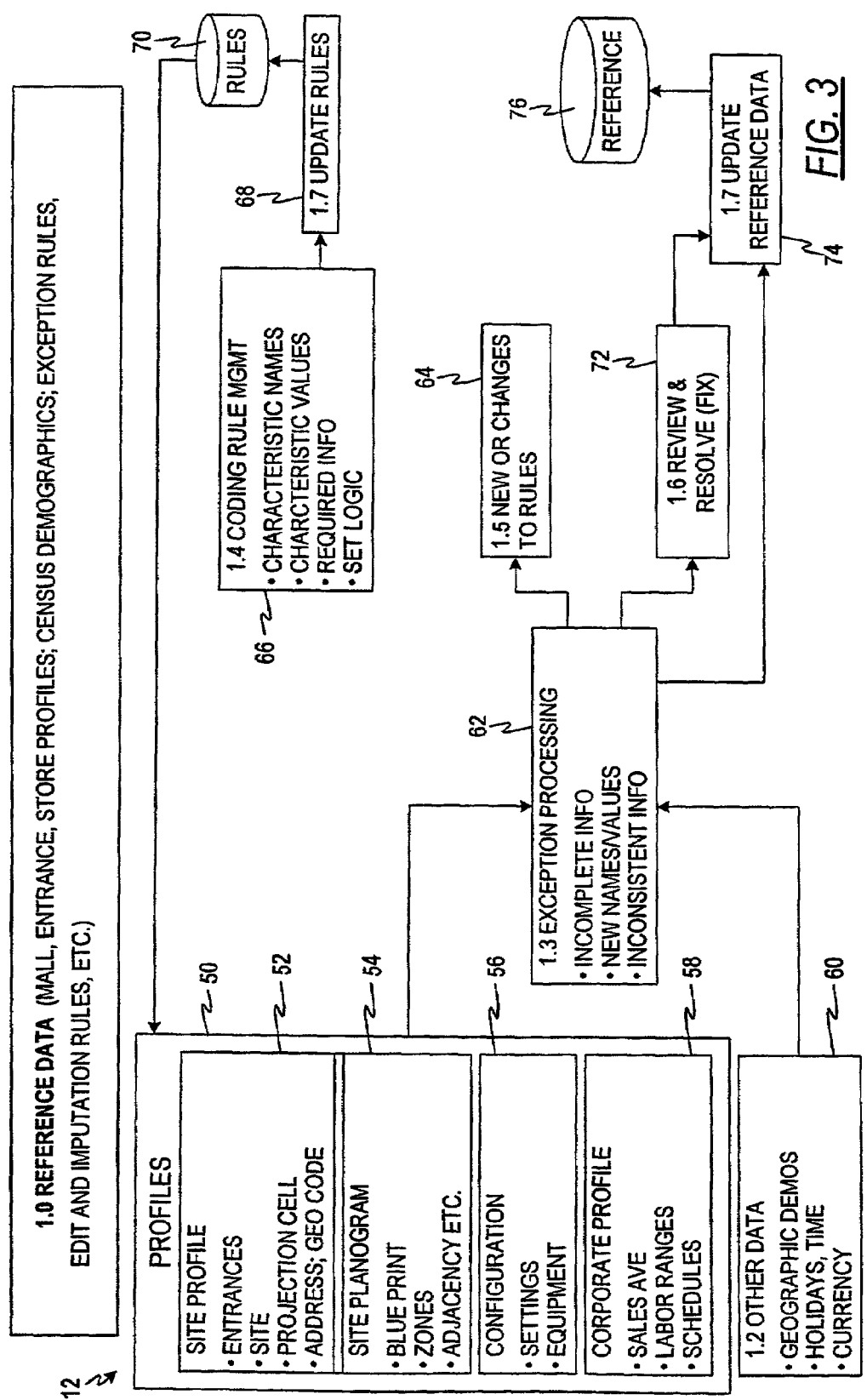
FIG. 3 is a block diagram showing the operation and use of a reference data module in one embodiment of the present invention.

FIG. 3 is a block diagram showing in more detail the function and operation of the reference data module 12. The reference data module 12 makes use of profiles 50 to gather and sort information from users. Data included in user profiles 50 include site profiles 52 which contain information on entrances, the site, projection cells and address and geographic code information. Projection cells are characteristics about a site that identify which projection segment a particular site represents. For example the characteristic of Census Region would describe the projection cell for census regions. Each site would have a value such as South, Central, East, etc. that defines the specific region that site represents. Site planogram information 54 is also collected, including, for example, user blueprints, information on zones within user malls, and data relating to store adjacency for individual retailers and shopping malls. Configuration data 56 are also included in the enterprise profiles 50, with settings and equipment information making up the bulk of the configuration data. Corporate profiles 58 are also made part of the enterprise profiles 50, and this includes such information as sales averages, labor cost ranges, and scheduling information.

Other, non-site-specific information is incorporated into the reference data module 12 as shown in the "other data" block 60. This information includes data on geographic demographics, holidays and time information, and data on currency.

Data from the enterprise profiles 50 and other data 60 are subjected to exception processing as shown in block 62. The exception processing function 62 of the reference data module 12 scans incoming data for incomplete information, new names or values, and inconsistent information. If any such exceptions are found during the exception processing function 62, the excepted-to data are put through a "review & resolve" function as shown in block 72 before the reference data are updated as shown in block 74 and added to the reference data database 76. Alternatively, if no exceptions are found during the exception processing function 62, the data are updated as shown in block 74 and input into the reference data database 76 without passing through the "review & resolve" function at block 72.

Another alternative for outgoing data from the exception processing function 62 is that new rules or changes to old rules will be encountered, as shown in block 64. Rules define how incoming data are treated by the reference data module 12 and the indexing system 10 as a whole. If new or changed rules are encountered as shown in block 64, the rules are subjected to a coding rule management step 66. In the coding rule management step 66 the new or changed rules are reviewed for and/or given characteristic names, characteristic values, required information, and logical flow for data usage via the rules. Next, the rules are updated as shown in block 68 and input into a rules database 70. The rules database 70 is routinely accessed by the indexing system 10 to govern how data are handled.

Figure 4:
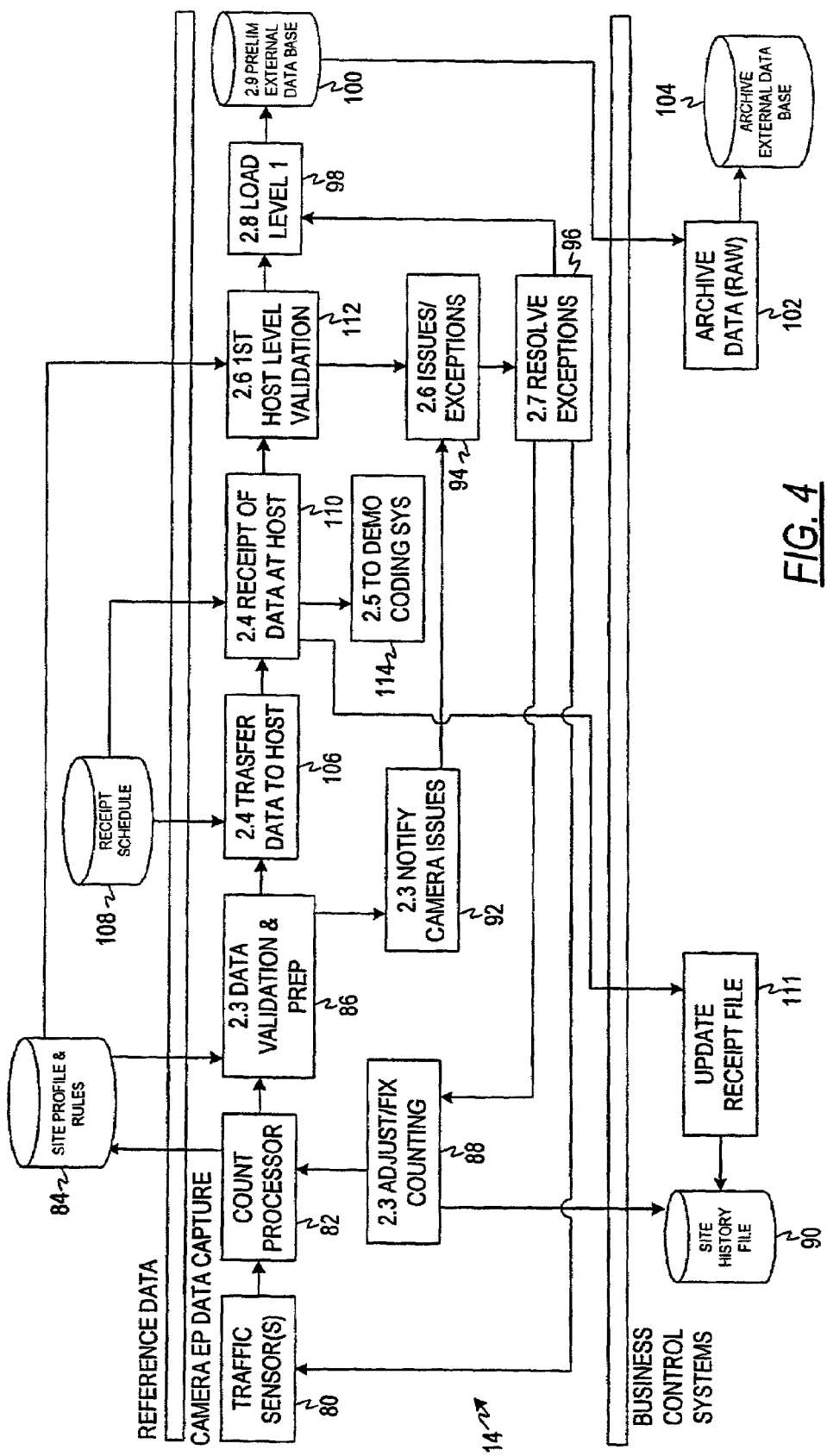
FIG. 4 is a block diagram showing the operation and use of a visioning module in one embodiment of the present invention.

FIG. 4 is a block diagram showing the function and operation of the visioning module 14 in greater detail. Data collection in the visioning module 14 is first carried out at external site cameras or traffic sensors 80. The external site cameras or traffic sensors 80 monitor mall or retail space entrances and forward traffic counts to count processors 82. The count processors 82 reference site profile data and rules data to validate and prepare the data from the external site cameras or traffic sensors 80 as shown in block 86. Following data validation and preparation at block 86, counting is adjusted and fixed as shown by block 88, and the traffic count is added into the site history file 90.

Alternatively, following the data validation and preparation step 86, equipment or count issues may be identified and the site must be notified of any equipment or count issues as shown in block 92. If equipment or count issues are identified at step 92, issues are analyzed and exceptions accounted for at block 94. Exceptions are then resolved at block 96 and a level 1 data group is loaded as shown in block 98. Data is then sent to a preliminary external database 100 before being archived as raw data at block 102 and further archived in an external database 104.

Validated and prepared data at block 86 is transferred to a host computer at block 106. This transfer is governed by a receipt schedule 108 in the reference data module 12. Data are then received at the host as shown in block 110, and this receipt is also governed by the receipt schedule 108 in the reference data module 12. After being received at the host as shown in block 110, the data are given a host level validation as shown in block 112 before being loaded into level 1 at block 98 and forwarded to a preliminary external database 100 as described above. Data received at the host in block 110 may also be forwarded to a demographics coding system 114 and analyzed for issues and exceptions at block 94 similarly to the data directly from the external site cameras or other traffic sensors 80. When data are received at a host at block 110, a receipt file is updated as shown in block 111 and this updated receipt is added to the site history file 90.

Figure 5:
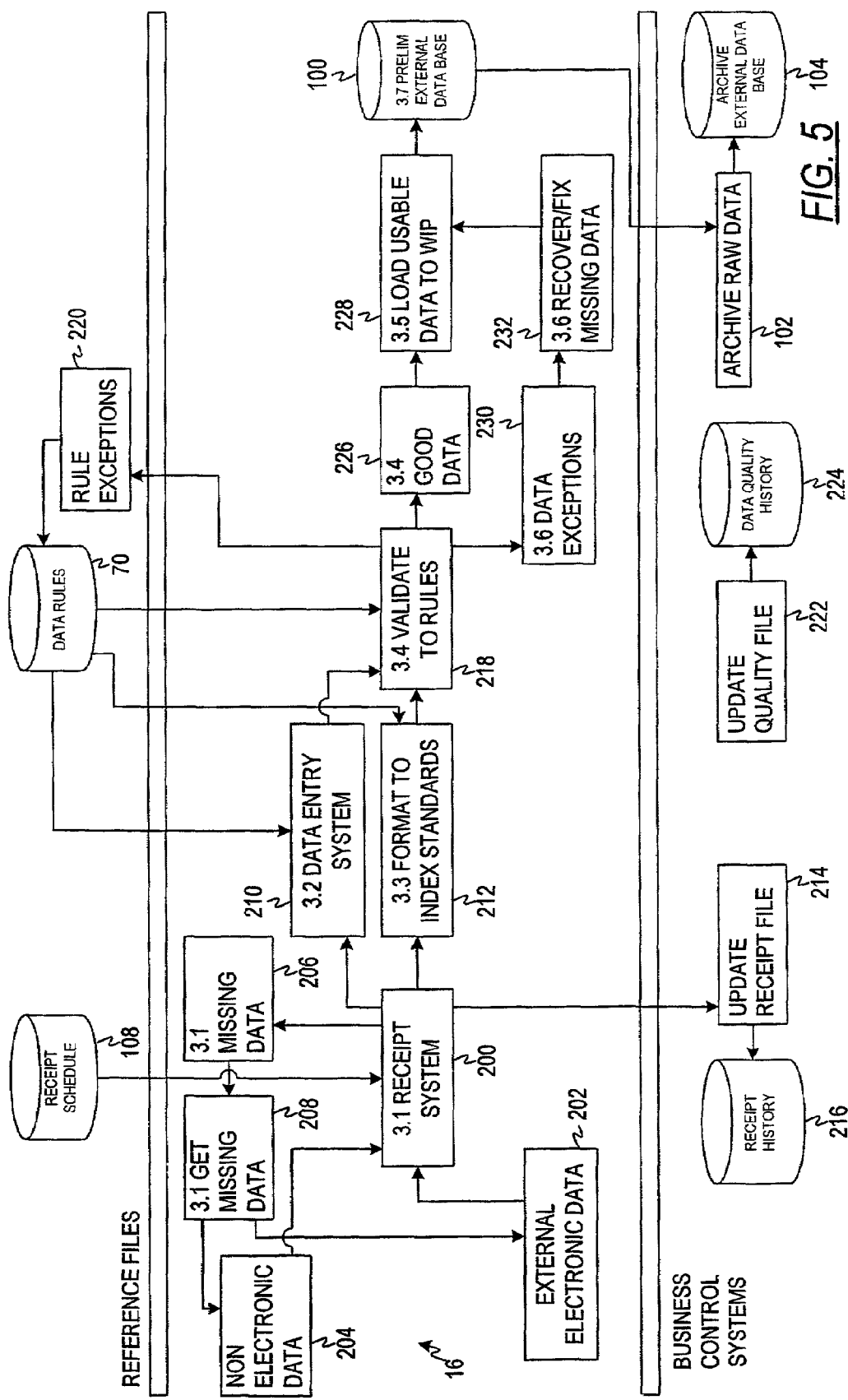
FIG. 5 is a block diagram showing the operation and use of a data collection module in one embodiment of the present invention.

FIG. 5 shows the operation and use of the data collection module 16 in more detail. The data collection module 16 includes a receipt system 200 which receives data from electronic sources 202 and nonelectronic sources 204. The scheduling of data receipt by the receipt system 200 is governed by a receipt schedule 108 in reference files generated by the reference data module 12. After receiving incoming data, the receipt system identifies whether data are missing at block 206 and retrieves any missing data as shown in block 208. Once data are received and missing data are accounted for, the receipt system 200 forwards the data to the data entry system 210, formats the data to index standards as shown in block 212, and/or forwards the data to update a receipt file as shown in block 214 before filing receipt information in a receipt history 216.

Data rules found in reference files in the reference data module 12 affect the handling of data in the data entry system 210 during the formatting to index standards 212 and ultimately in a "validate to rules" step shown in block 218. In the "validate to rules" step, incoming data from the data entry system 210 and the "format to index standards" step 212 are checked to assure compliance with rules. Rule exceptions 220 may be generated at this point, and these rule exceptions are further incorporated into the data rules 70. Validation to rules as shown in block 218 enables the data to be used to update a quality file as shown in block 222. Information on data quality may then be input into a data quality history 224. Further, following validation to rules at step 218, good data as shown in block 226 are forwarded to a "load usable data to work in progress ('WIP')" step at block 228 before being sent to a preliminary external database 100, archived as raw data at block 102, and archived in an external database 104. Data that meet edit standards and/or are imputed and do not exceed imputation limits are usable data. These data are loaded into a temporary or "work-in-progress" ("WIP") data structure for the remainder of the edit.

Validation to rules at step 218 may result in data exceptions 230 being discovered in the data collection module 16. When data exceptions 230 are discovered, the data collection module 16 will attempt to recover and/or fix missing data as shown in block 232 before loading usable data to a WIP data structure at block 228 as discussed above.

Figure 6:
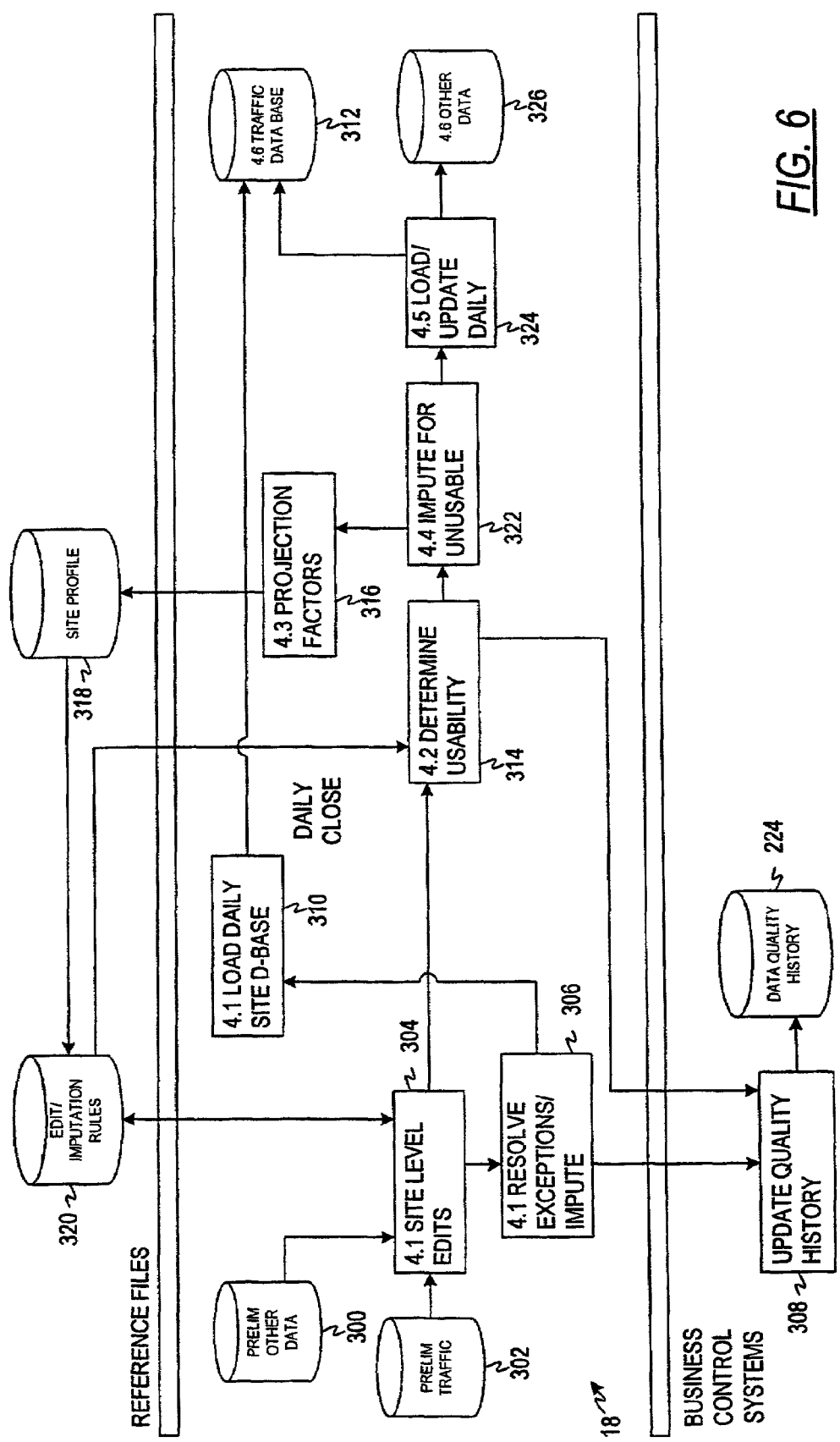
FIG. 6 is a block diagram showing the operation and use of an edit and transformation load module for use in one embodiment of the present invention.

FIG. 6 shows the structure and use of an edit and transformation load module 18 for use in one embodiment of the present invention. As shown in block 304, site level edits are performed on preliminary traffic data 302 and other data 300. These site level edits 304 are a further check on the accuracy and expected results of the incoming data from users and other sources. The site level edits 304 rely on edit and imputation rules 320 to discover and resolve exceptions to expected data values and impute data values for missing data as shown in block 306. Once exceptions are resolved and missing data are imputed, a quality history is updated as shown in block 308 and information on data quality is stored in a data quality history database 224. Following the resolution of exceptions and imputation of missing values at block 306, the edit and transformation load module 18 loads a daily site database at block 310 for each site from which data is acquired. The data may then be input into a traffic database 312.

Following the site level edits at block 304, the edit and transformation load module 18 determines the usability of the data at block 314. An imputation function may be performed on unusable data as shown in block 322. At this point, projection factors 316 may be generated by the edit and transformation load module 316 and inserted into the site profile 318, where the projection factors may be used to alter edit and imputation rules 320. The edit and imputation rules 320 may then in turn be used to more thoroughly determine data usability at block 314. Once usability of data is determined at block 314, the usability information is used to update data quality history at block 308 and stored in a quality history database 224. The overall data, including both imputed data and standard data, are loaded and/or updated daily as shown in block 324 to a traffic database 312 and a database for other index data 326.

Figure 7:
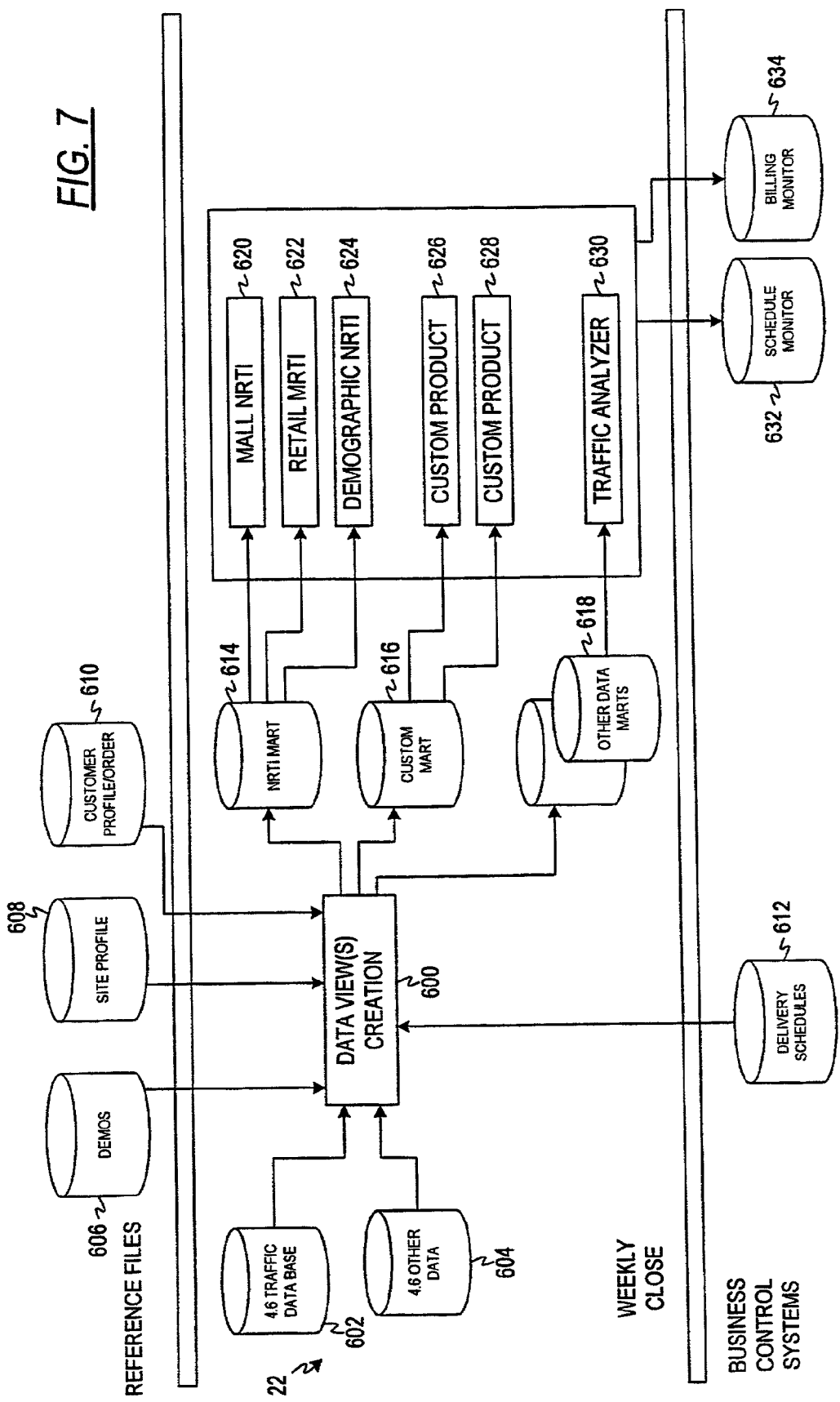
FIG. 7 is a block diagram showing the operation and use of a delivery module for use in one embodiment of the present invention.

FIG. 7 shows the operation of a delivery module 22 for use with the present invention. The delivery module 22 collects data from a variety of sources and manipulates the data into a displayable and deliverable format for use by users. As shown in block 600, data views are created by gathering data from a traffic database 602 and a database 604 containing other data. Data are also collected from a demographics database 606, a site profiles database 608, and a customer profile/order database 610. Data regarding delivery schedules are collected from a delivery schedules database 612.

These data are used to populate several data marts, including an NRTI mart 614, a custom mart 616, and other data marts 618. In turn, the combined data from multiple users in the NRTI mart are made available to users in the form of a mall NRTI 620, a retail NRTI 622, and a demographic NRTI 624. Combined data in the custom mart 616 are made available to custom users as custom products as shown in blocks 626 and 628. Custom products include indexes and data related to specific customers' industrial or geographic divisions, for example. Data in other data marts 618 may be made available to users in a variety of formats, for example, as a traffic analyzer 630. User access to the information is monitored by a schedule monitor 632 and a billing monitor 634.

Figure 8:
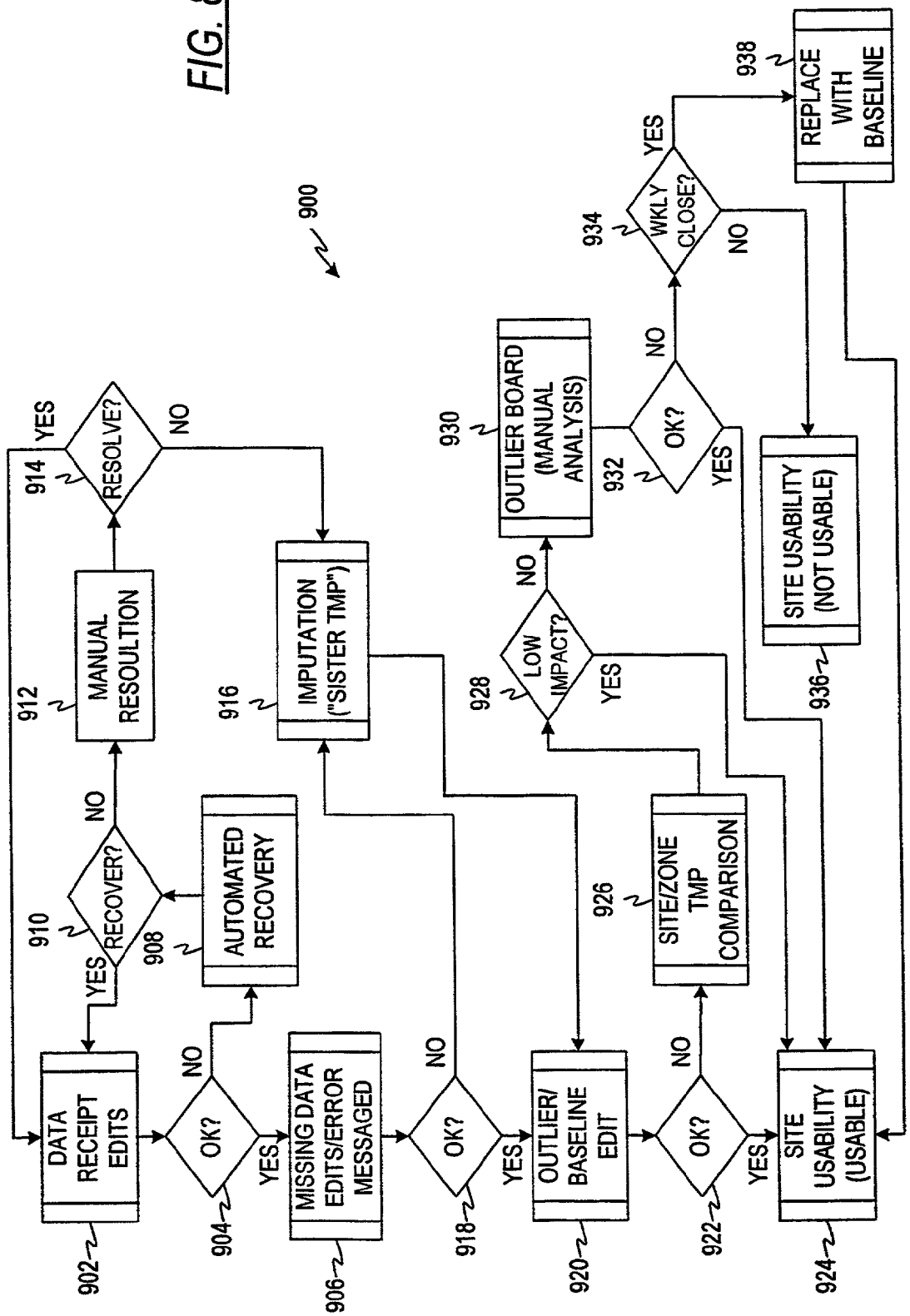
FIG. 8 is a flow chart showing the operation of a data edit process for use in the present invention.

FIG. 8 is a flow chart showing greater detail on the operation of a data collection and editing process 900 for use in the present invention. The overall use of this process is shown more generally in FIGS. 5 and 6. The collection of data to generate the NRTI relies upon automated data receipt. The data automatically received is subjected to data receipt edit checks as shown in block 902. At decision block 904, it is determined whether the data are in accordance with the edit checks. If the data are in accordance with edit checks, the collection and editing process 900 continues to determine whether there are missing data in a sample or whether any data contain error messages at block 906. Alternatively, if the incoming data are not in accordance with data receipt edits, the process 900 continues to an automated recovery process 908 from decision block 904. Next, at decision block 910, the process 900 determines whether the automated recovery process 908 was in fact able to recover the noncompliant data. If the data have been recovered, the process 900 returns to compare incoming data to receipt edit criteria at block 902. If the data have not been recovered, the process 900 proceeds to require manual resolution of the noncompliant data. If manual resolution is successful at decision block 914, the process 900 returns to the data receipt edits block 902. If manual resolution does not resolve the problem at block 914, the process 900 proceeds to perform an imputation function at block 916.

The imputation function at block 916 is also performed if missing data or data with error messages are found at block 906. In this pathway, the process 900 proceeds from decision block 918 to the imputation function at block 916. The imputation function attempts to impute new values based on previously known values for the data in question. Whether the process 900 proceeds through the imputation function 916 or receives no error messages or missing data alerts at decision block 918, the process continues to an outlier/baseline edit function at block 920. An outlier in the present invention is any number that falls outside an expected range for the corresponding data field. A baseline in the present invention is a standard value that can be input as data if other forms of data correction are unworkable. If the data pass through the outlier/baseline edit function at block 920 without any outlier identifications, the process 900 proceeds through decision block 922 and the site from which the data were collected is deemed usable as shown at block 924.

If data are found to fall outside of the outlier range at decision block 922, the data pass to a site/zone traffic monitoring point ("TMP") comparison at block 926. A traffic monitoring point is a location where traffic is monitored, for example a store or mall entrance. Next, if the difference between the expected and actual data values is expected to have a low impact on the indexing system at decision block 928, the site is deemed usable at block 924. If the difference in the data values are not expected to have a low impact on the indexing system at block 928, the process continues to block 930 to an outlier board where a manual analysis is done on the data. If the data flowing from the manual analysis step at block 930 are deemed acceptable at decision block 932, the process 900 proceeds to mark the site providing the data as usable at block 924. If the data flowing from the manual analysis step at block 930 are deemed unacceptable at decision block 932, it is determined at decision block 934 whether the current data are necessary for a weekly close. If the data are not necessary for a weekly close, the site where the data are located is deemed not usable at block 936. If the data are necessary for a weekly close, the data are replaced with baseline amounts at block 938 and the site is deemed usable at block 924.

Figure 9:
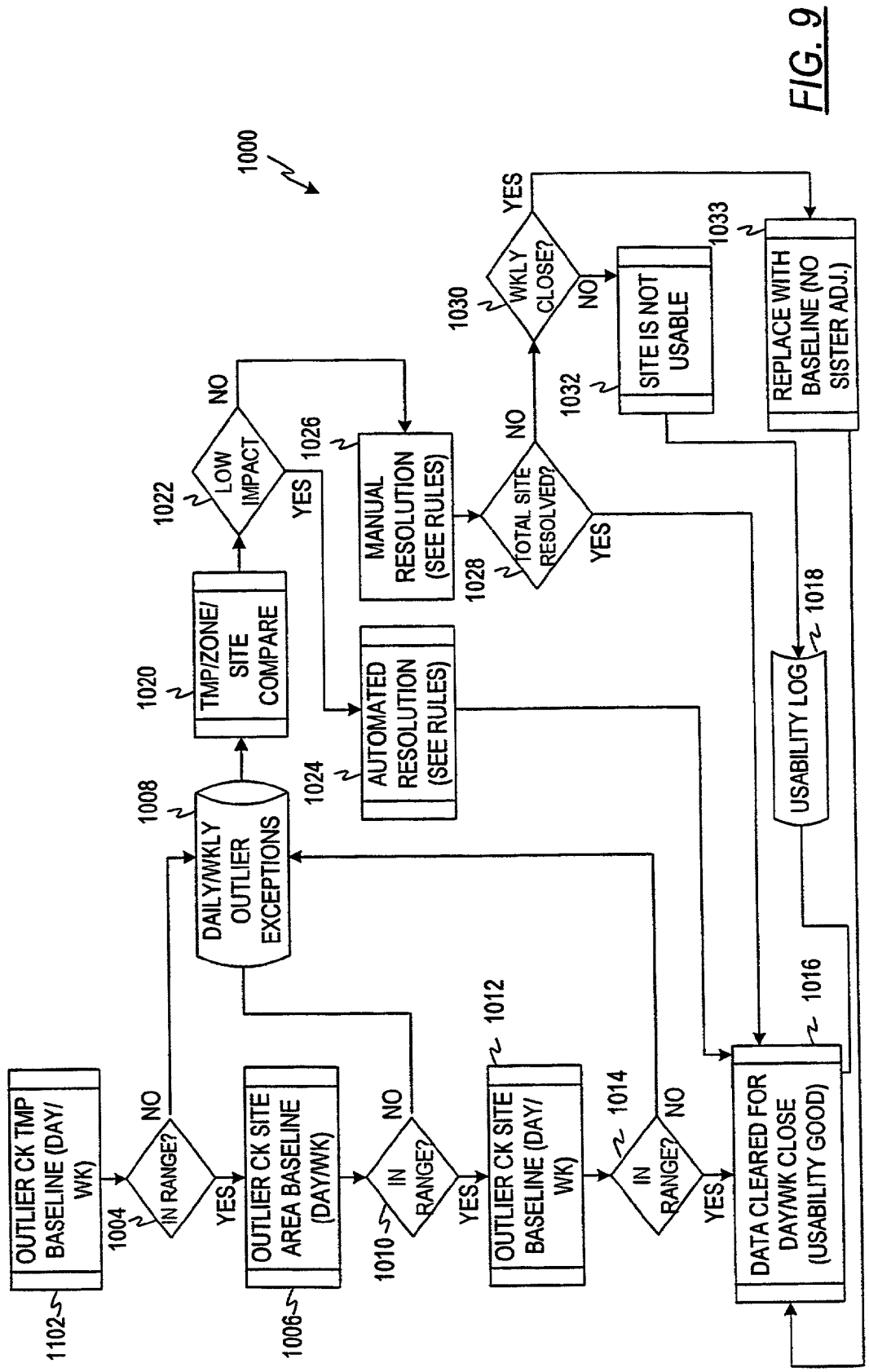
FIG. 9 is a flow chart showing the operation of an outlier process for use in the resent invention.
Figure 10A:
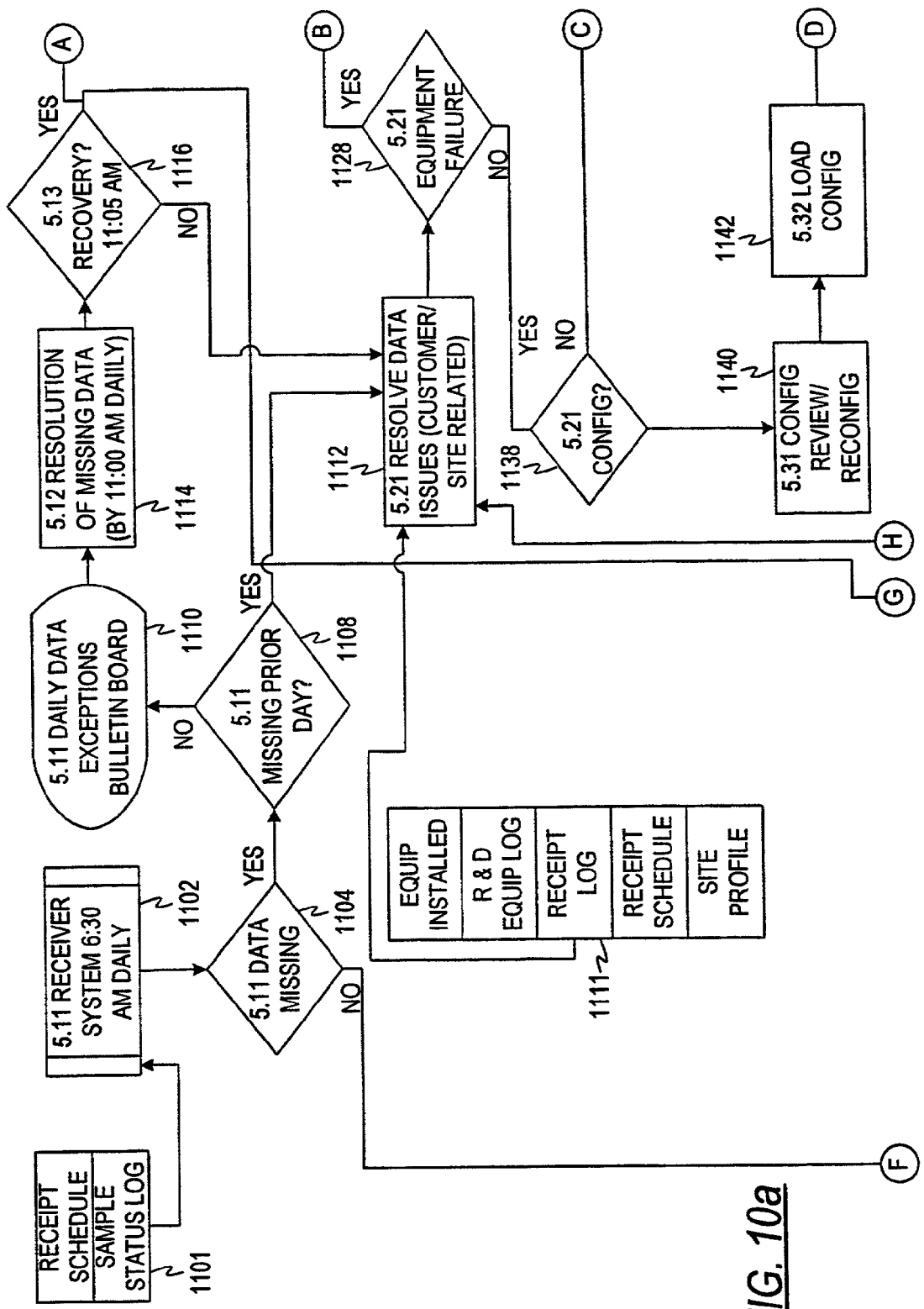
FIG. 10 is a flow chart showing the operational work flow for daily data receipt, edits, imputation, sample and rules maintenance functions for use in the present invention.
Figure 10B:
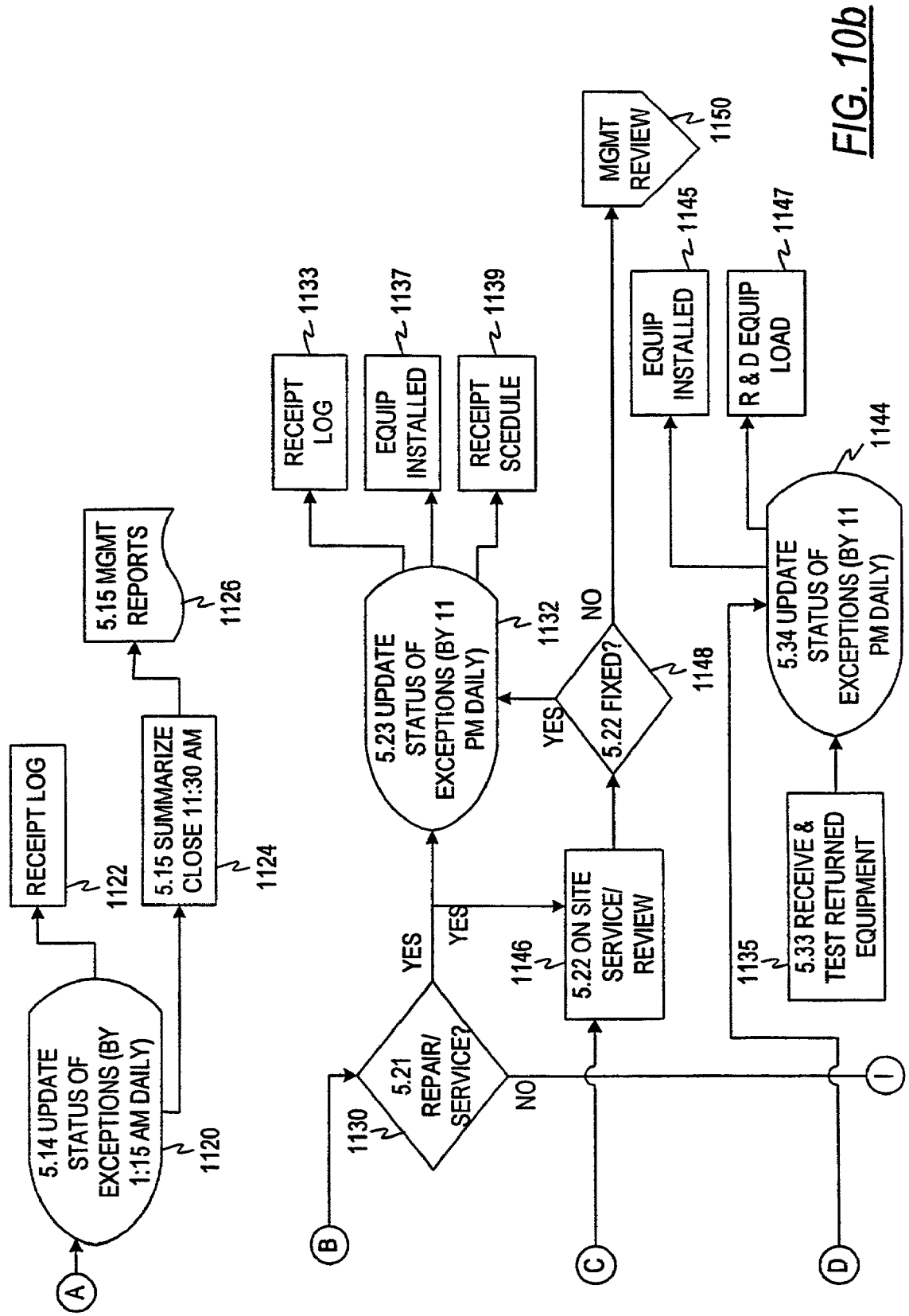
Figure 10C:
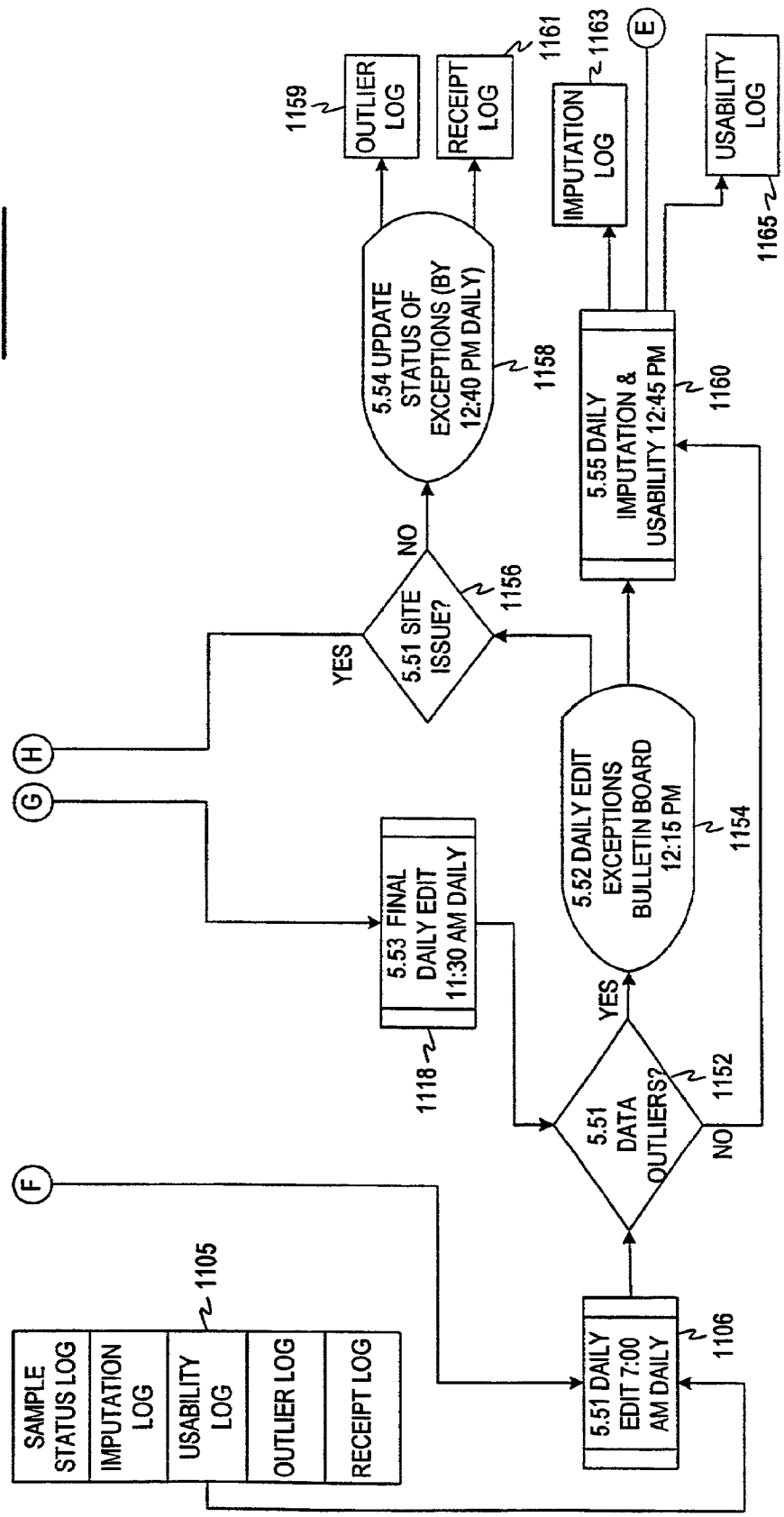
Figure 10D:
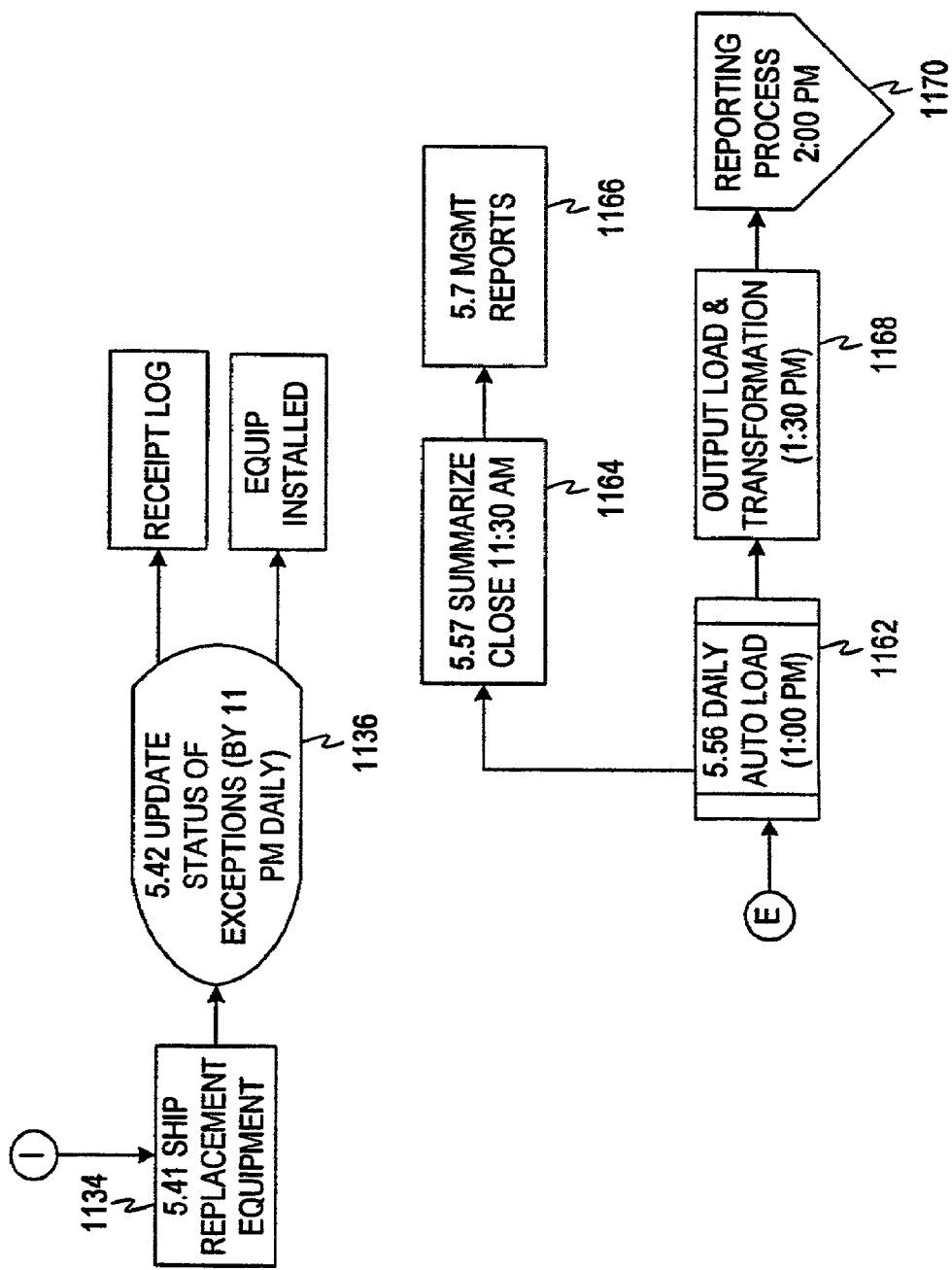

FIG. 9 is a flow chart showing in greater detail the operation of an outlier process 1000 for use in one embodiment of the present invention. This process is utilized at blocks 920 and 930 in FIG. 8. The outlier process 1000 serves to detect incoming data falling outside of a predetermined range of expected values for the data. The outlier process 1000 begins at block 1002 where a TMP outlier check is performed on incoming data. If data are determined to be within a predetermined range at decision block 1004, the outlier process 1000 proceeds to perform an outlier check for the site area at block 1006. If the data are found to be outside the predetermined range at decision block 1004, the outlier process 1000 proceeds to store the data in a daily/weekly outlier exceptions database 1008.

Following a site area outlier check at block 1006, if the data are determined to be within a predetermined site area range at decision block 1010, the process 1000 continues to a site outlier check at block 1012. If the data are determined to be outside a predetermined site area range at decision block 1010, the data are stored in the daily/weekly outlier exceptions database 1008. Data falling within a predetermined site range at decision block 1014 are cleared for daily or weekly closing at block 1016 and the site from which the data were collected is marked as having a good usability. This usability status is then saved in a usability log 1018.

Data within the daily/weekly outlier exceptions database 1008 are compared with TMP, zone, or site data at block 1020. If the outlying data are determined to have a low impact at decision block 1022, an automated resolution of the outlying data is performed at block 1024 and the data are cleared for daily or weekly close at block 1016, the site usability is marked as good, and this status is stored in a usability log 1018 as described above. If it is determined at decision block 1022 that the outlying data will not have a low impact, a manual resolution of the outlying data is performed at block 1026. If problems at the site from which the data were collected are resolved, as shown in decision block 1028, the system proceeds through the data clearing step 1016 as described above. If the problems at the site are not resolved via manual resolution at decision block 1028, it is determined whether the data are needed for a weekly close at block 1030.

If the data are not deemed necessary for a weekly close at decision block 1030, the site is marked as "not usable" as shown in block 1032 and this status is recorded in the usability log 1018. If the data are deemed necessary for a weekly close at decision block 1030, the outlying data are replaced with a baseline reflecting a standard value for the data at block 1032 and the process 1000 proceeds through data clearing at block 1016 and usability recording at block 1018 as described above.

The data collection and editing process 900 and the outlier process 1000 combine to retrieve and generate high-quality data for the computation of indexes based on pedestrian traffic. Indexes using these data are developed by mathematical algorithms run on the data management server 38. For example, one type of index enables a user to compare the pedestrian traffic at her store to the pedestrian traffic at other similarly situated stores. Such a comparison index is created by reviewing all incoming data and sorting the data by store type, location, and other profile information. Average visitors to the store type in general may then be compared to the actual number of visitors to a user's store.

Peak visitor summaries are also created using the indexing system of the present invention. A peak visitor summary summarizes the number of visitors at a store type or store location according to the time of day, week, month, or year. The use of peak visitor summaries allows users to predict and plan for peak periods more effectively.

FIG. 10 is a flowchart displaying an operational work flow for daily data receipt, edits, and imputation functions as used in the present invention and shown from a system perspective in FIGS. 1-9. In a preferred embodiment, the data receipt workflow is a 7 day function operating from 6:00 AM to 2:00 PM daily. From 6:00 AM to 11:30 AM, the function focuses on receipt and recovery of any missing data from the prior day of retail traffic. From 11:30 AM to 2:00 PM daily, efforts focus on recovering data for prior days in the week and/or recovery of any data for the prior day that could not be recorded before the close of the prior day. Any recovered data in the week will be processed and the day updated in a weekly close. Data recovered from prior weeks are archived but not updated. Closed weeks are not restarted for late data receipts. The system has two types of "closes." Daily closes happen every day when all relevant data have been collected, and weekly closes occur once all data have been collected for the week. Exceptions generally cover any data that do not meet the system's expected criteria, and include error messages, missing data, outlier data, and other data faults.

The daily receipt of information begins at the daily receiver system block 1102. A receiver system consolidation is run to evaluate all data receipts from the prior day. At this point exceptions in incoming data are identified by site and also by TMPs within sites. Data may also be prioritized at block 1102 based on data specifications, and sites may be summarized to reflect a total amount of data missing or a percentage of data missing. The receiver system automatically includes prior days in the week that have been recovered late. Further, missing data are closed when data are recovered and updates are performed to prior day logs for a weekly close. The data required by the receiver system include a history of data receipts for the site and TMP, which may include the total number of missing days in the past four weeks or past year. Data on the data of system installation, sample status, average weekly traffic or square footage for the site, usability history for the site, a site commercial enterprise bill of materials including ownership information, error messages, and status on the prior day are also required by the receiver system.

If no data are found by the receiver system to be missing from a site, as shown at decision block 1104, the data flows on to the daily edit function as shown at block 1106. If data are found by the receiver system to be missing, the receiver system determines at block 1108 whether data for the prior day are missing. If no data are missing for the prior day, the status of the missing data is posted to a daily data exceptions bulletin board at block 1110. If data are missing for the prior day, the system proceeds to resolve data issues that are customer or site related as shown in block 1112.

When the daily data exceptions bulletin board 1110 is updated that the prior day's data is missing, the system progresses to block 1114, where the missing data is resolved. In the resolution step, missing data are given priority by error type. Non-recoverable error issues are sent to support services. Next, highest priority exceptions are addressed first and manual data recovery is attempted. The status of each data exception is logged. The resolution step is preferably completed by 11:00 AM each day.

In the resolution step 1114, exceptions are organized by priority according to receipt and editing prioritization rules. Exceptions that repeat from the prior day are forwarded to either a function or a person handling these repeat exceptions. The resolution step 1114 also involves routing capabilities to other functions, including an automated status on any routed items, logging and tracking item status, closing missing data exceptions when data are recovered and updating to the prior day's logs for the weekly close. The exception resolution step 1114 requires status logs on all open exceptions, and information on accountability and routing.

The system determines whether recovery is successful at decision block 1116. At this step, the system pulls a list of all sites or TMPs which show exceptions referred for resolution in the status logs. All feasible data are recovered, and statuses are updated. Counting locations with unrecovered data are placed on a technical bulletin board where a support services function works to recover or resolve the issues in the order of priority grouping. This late recovery process preferably occurs by 11:05 AM each day, and the process provides a prioritized summary of exceptions that are ready for additional attempts at recovery of the data from the site. When data are recovered, a missing data exception corresponding to that data is closed. The late recovery process requires log updates and work notes from other groups for its operation. If recovery is successful at decision block 1116, the system progresses to a final daily edit at block 1118 and the status of exceptions is updated as shown in block 1120, preferably by 11:15 AM. The fact that data were received is recorded in a receipt log 1122. Further, management summaries on the amount of data received, the total number of exceptions, the number of resolved exceptions, the number of outstanding exceptions, and the number of lade day and TMPs recovered by priority groups are prepared preferably by 11:30 AM each day as shown in block 1124. Management reports are generated with these data as shown in block 1126.

When a final daily edit is performed at block 1118, the system determines at decision block 1152 whether there are any data outliers that need to be addressed. If there are outliers, the system proceeds to block 1154 where a daily edit exceptions bulletin board is updated. From block 1154, the system proceeds to decision block 1156 where it is determined whether a site issue is causing data outliers to occur. If a side issue is found, the system proceeds to block 1112 to resolve customer or site related issues. If no site issues are found, the system updates the exception status at block 1158 and the existence of excepted-to data is noted in an outlier log and a receipt log.

Following the update of the daily edit exceptions bulletin board at block 1154, the system also progresses to a daily imputation and usability function at block 1160. At this point, unaccounted for traffic monitoring point exceptions are resolved, site status is monitored, and troubleshooting steps are taken if necessary. Imputation and usability data are stored, respectively, in an imputation log and a usability log. Following imputation and usability checks at block 1160, the system performs a daily auto load function at block 1162. This function monitors the status of data collection and performs further troubleshooting when necessary. After the daily auto load function completes, management reports 1166 are prepared and outstanding issues are evaluated and prioritized in a summarize close function at block 1164. The conclusion of the daily auto load function at block 1162 also leads to an output load and transformation function at block 1168 and the daily data receipt, edit, and imputation procedure concludes with a reporting process at block 1170.

Returning to a failed recovery outcome at block 1116, the resolution of customer or site related data issues at block 1112 is handled by a staff to resolve problems seven days a week and with coverage for all time zones. The resolution of data issues is considered a support service. The support service provided in the present invention diagnoses and resolves site level issues identified in the daily and weekly editing processes. The priority in support services is to resolve exceptions and recover data before the weekly close.

The resolution of data customer or site related data issues is handled by priority review of problem descriptions and problem logs. Site troubleshooting may be accomplished remotely or by contacting on-site service. If it is discovered that problems are arising due to equipment failure at decision block 1128, repair or service on the equipment will be attempted as shown in decision block 1130. If repair or service is successful, the status of exceptions will be updated as shown in block 1132, and "receipt log," "equip installed," and "receipt schedule" data fields will all be updated with relevant information. If repair or service is unsuccessful at decision block 1130, replacement equipment will be shipped as shown in block 1134. Returned equipment is received and tested as shown in block 1135 and the status of exceptions is updated as shown in block 1144. After replacement equipment is shipped, the status of exceptions is updated at block 1136 and "receipt log" and "equip installed" data fields are updated with the new information.

If a configuration is found not to be the source of a problem at decision block 1138, an on site service or review is conducted as shown in block 1146. If this results in the problem being fixed, as decided in decision block 1148, the status of exceptions is updated in block 1132 as described above. If the on site service or review does not result in the problem being fixed, the problem is forwarded for management review as shown in block 1150.

When a final daily edit is performed at block 1118, the system determines at decision block 1152 whether there are any data outliers that need to be addressed. If there are outliers, the system proceeds to block 1154 where a daily edit exceptions bulletin board is updated. From block 1154, the system proceeds to decision block 1156 where it is determined whether a site issue is causing data outliers to occur. If a side issue is found, the system proceeds to block 1112 to resolve customer or site related issues. If no site issues are found, the system updates the exception status at block 1158 and the existence of excepted-to data is noted in an outlier log and a receipt log.

If the problems are not due to equipment failure at decision block 1128, it is determined whether problems are due to configuration errors at block 1138. If the problems are found to be due to configuration errors at decision block 1138, the configuration is reviewed and/or reconfigured at block 1140. Counting algorithm configurations may be reviewed, recordings may obtained, and adjustments may be made to the configurations at this step as well. Next, at block 1142, the configuration is loaded or released to the site with the effective date for the configuration update. The status of exceptions is then updated at block 1144 and "equip installed" and "R&D Equip log" data fields are updated.

If the problems are not found to be due to configuration errors at block 1138, an on site service or review is performed at block 1146. If problems are fixed following the on site service or review, as shown in decision block 1148, the status of exceptions is updated at block 1132. If the on site service or review does not result in the problems being fixed, the problem is forwarded for management review at block 1150.

While the present invention has been described with reference to one or more particular embodiments, those skilled in the art will recognize that many changes may be made thereto without departing from the spirit and scope of the present invention. For example, while the invention has been described with respect to commercial use in malls and retail establishments, the traffic monitoring and indexing functions of the invention may also be utilized in governmental planning activities. Each of these embodiments and obvious variations thereof is contemplated as falling within the spirit and scope of the claimed invention, which is set forth in the following claims.

What is claimed is:

1. A pedestrian traffic indexing system comprising:
a plurality of traffic monitors at a plurality of provider sites;
a server connected to said traffic monitors to receive pedestrian traffic data from said traffic monitors, the pedestrian traffic data comprising pedestrian traffic data from the provider sites;
a traffic database for storing said pedestrian traffic data;
a database for storing non-traffic business related data wherein the non-traffic business related data comprises census demographics data, sales data, site profiles associated with the provider sites, and corporate profiles including labor data;
a view creator for generating national retail traffic index data by processing data stored in the traffic database and the database for storing non-traffic related data, wherein the national retail traffic index data includes a plurality of calculated indexes related to the provider sites, the indexes calculated using a plurality of metrics with each metric related to the plurality of provider sites and based upon both the pedestrian traffic data and the non-traffic business related data;
a national retail traffic index data mart for storing the national retail traffic index data; and
a data communications connection for transferring data among the traffic database, the at least one database for storing non-traffic related data, the view creator, the national retail traffic index database and the server wherein a user can access the national retail traffic index data mart via the data communications connection to access the national retail traffic index data.

2. A method for indexing pedestrian traffic comprising:
electronically collecting pedestrian traffic data from a plurality of traffic monitoring points;
storing the pedestrian traffic data in a traffic database;
storing non-traffic business related data including non-traffic business related data for a user in at least one database for storing non-traffic business related data wherein the non-traffic business related data comprises census demographics data, sales data, site profiles associated with the provider sites, corporate profiles including labor data;
generating national retail traffic index data by processing data stored in the traffic database and the at least one database for storing non-traffic business related data, wherein the traffic index data includes a plurality of calculated indexes related to the traffic monitoring points, the calculated indexes determined by incorporating mathematical algorithms which utilize both the pedestrian traffic data and the non-traffic related data; and storing the national retail traffic index data in a national retail traffic index data mart to allow the user access thereby providing the ability to analyze the national retail traffic index data in light of pedestrian traffic data from the monitoring points and non-traffic business related data.

3. The pedestrian traffic indexing system from claim 1, wherein the at least one database for storing non-traffic business related data comprises:
    a demographics database for storing the census demographics data;
    a profiles database for storing the site profiles data and the corporate profiles data, wherein the site profiles are associated to the plurality of provider sites, and wherein the corporate profiles are associated to a plurality of corporations; and
    a customer database for storing the sales data.

4. The method for indexing pedestrian traffic from claim 3, wherein the step of storing non-traffic business related data in at least one database for storing non-traffic business related data comprises:
    providing a demographics database for storing the census demographics data;
    providing a profiles database for storing the site profiles data and the corporate profiles data, wherein the site profiles are associated to the plurality of provider sites, and wherein the corporate profiles are associated to a plurality of corporations; and
    providing a customer database for storing the sales data.

5. The pedestrian traffic indexing system from claim 3, wherein labor data is stored in the corporate profiles; and
    wherein the view creator further generates national retail traffic index data by processing the sales data in the customer database, the labor data in the profiles data and the pedestrian traffic data in the traffic database.

6. The method for indexing pedestrian traffic from claim 4, wherein the labor data is stored in the corporate profiles; and
    wherein the step of generating the national retail traffic index data further comprises processing the sales data in the customer database, the labor data in the profiles data and the pedestrian traffic data in the traffic database.

7. The pedestrian traffic indexing system of claim 3 wherein the plurality of traffic monitors comprises a plurality of video cameras.

8. The system of claim 3 wherein the view creator edits the traffic data for usability prior to using for the computation of indexes.

9. The system of claim 3 wherein the view creator recognizes missing data and performs imputation to replace the missing data.

10. The system of claim 3 wherein the view creator detects outliers in the traffic data and makes adjustments therefor.

11. The pedestrian traffic indexing system of claim 3 further comprising at least one hub, the at least one hub connecting the plurality of traffic monitors at each of the plurality of provider sites.

12. The pedestrian traffic indexing system of claim 3 wherein the traffic monitors are connected to the server via the Internet.

13. The pedestrian traffic indexing system of claim 3 wherein the traffic monitors are connected to the server via a virtual private network.

14. The method of claim 4 wherein collecting pedestrian traffic data automatically from a plurality of traffic monitoring points comprises collecting pedestrian count data via a virtual private network from a plurality of traffic monitoring points.

15. A system for monitoring pedestrian traffic at a plurality of predetermined locations and generating a retail traffic index, comprising:
    a plurality of traffic monitors located at a plurality of specified locations, each traffic monitor for monitoring the flow of pedestrian traffic at the related specified location;
    a server connected to the plurality of traffic monitors for receiving and managing pedestrian traffic data;
    a pedestrian traffic database cooperating with the server to store the pedestrian traffic data;
    at least one non-traffic database cooperating with the server for storing non-traffic business related data wherein the non-traffic business related data comprises census demographics data, site profiles data associated with the provider sites, corporate profile data including labor data, and sales data;
    a data mart accessible by a user for accommodating a request from the user for national retail traffic index data, wherein the data mart includes a plurality of predetermined user selectable parameters and the request includes a set of user selected parameters; and
    a processor for generating requested national retail traffic index data, wherein the national retail traffic index data is calculated by the processor according to a plurality of mathematical algorithms which incorporate the data stored in the pedestrian traffic database and the at least one non-traffic database according to the user selected parameters wherein the user selected parameters include the identification of at least one specified location.

16. The pedestrian traffic indexing system from claim 15, wherein the at least one database for storing non-traffic business related data comprises:
    a demographics database for storing the census demographics data;
    a profiles database for storing the site profiles data and the corporate profiles data, wherein the site profiles are associated to the plurality of provider sites, and wherein the corporate profiles are associated to a plurality of corporations; and
    a customer database for storing the sales data.

17. The pedestrian traffic indexing system from claim 16, wherein the labor data is stored in the corporate profiles data; and
    wherein the view creator further generates national retail traffic index data by processing the sales data in the customer database, the labor data in the profiles data and the pedestrian traffic data in the traffic database.

18. The pedestrian traffic indexing system of claim 16 wherein the plurality of traffic monitors comprises a plurality of video cameras.

19. The system of claim 16 wherein the processors further edit the traffic data for usability prior to using for the computation of indexes.

20. The system of claim 16 wherein the processors further recognize missing data and perform imputation to replace the missing data.

21. The system of claim 16 wherein the processors further detect outliers in the traffic data and make adjustments therefor.

22. The pedestrian traffic indexing system of claim 16 further comprising at least one hub, the at least one hub connecting the plurality of traffic monitors at each of the plurality of provider sites.

23. The pedestrian traffic indexing system of claim 16 wherein the traffic monitors are connected to the server via the Internet.

24. The pedestrian traffic indexing system of claim 16 wherein the traffic monitors are connected to the server via a virtual private network.

25. A pedestrian traffic indexing system comprising:
a plurality of traffic monitors at a plurality of provider sites, the plurality of provider sites including a user's site;
a server connected to said traffic monitors to receive pedestrian traffic data from said traffic monitors;
a traffic database for storing said pedestrian traffic data;
a database for storing non-traffic business related data, comprising a demographics database for storing census demographics, a profiles database for storing site profiles and corporate profiles and a customer database for storing sales data, wherein the site profiles are associated to the plurality of provider sites, and wherein the corporate profiles include labor data for plurality of corporations;
a view creator for generating national retail traffic index data by processing data stored in the traffic database, including the pedestrian traffic data, and the database for storing non-traffic business related data, including the processing of the sales data in the customer database and the labor data in the profiles data database, wherein the national retail traffic index data includes calculated measures providing an indicator related to the pedestrian traffic data at the provider sites;
a national retail traffic index data mart for storing the national retail traffic index data; and
a data communications connection for transferring data among the traffic database, the at least one database for storing non-traffic business related data, the view creator, the national retail traffic index database and the server wherein a user can access the national retail traffic index data and may manipulate it to create a user relevant national traffic index for the user's provider site.

26. The system of claim 5 wherein the national retail traffic index data includes a calculation of average pedestrian traffic over a selected time period, and for a selected provider type.

27. The system of claim 5 wherein the national retail traffic index data includes a calculation of peak pedestrian traffic over a selected time period for a selected provider type.

28. The system of claim 26 wherein the data mart allows for a comparison of the average pedestrian traffic for the selected provider type with an average pedestrian traffic for the user's site.

29. The system of claim 27 wherein the data mart allows for a comparison of peak pedestrian traffic for the selected provider type with a determined peak pedestrian traffic for the user's site.

* * * * *

UNITED STATES PATENT AND TRADEMARK OFFICE
CERTIFICATE OF CORRECTION

PATENT NO. : 7,415,510 B1
APPLICATION NO. : 09/936987
DATED : August 19, 2008
INVENTOR(S) : George Kramerich It is certified that error appears in the above-identified patent and that said Letters Patent is hereby corrected as shown below:

Column 15, line 18,

Claim 4, delete "claim 3" and insert --claim 2--

Signed and Sealed this

Tenth Day of February, 2009

JOHN DOLL
*Acting Director of the United States Patent and Trademark Office*